United States Patent
Wenske et al.

(10) Patent No.: US 11,237,068 B2
(45) Date of Patent: Feb. 1, 2022

(54) METHOD AND DEVICE FOR THE TORQUE MEASUREMENT IN THE DRIVE TRAIN OF A WIND ENERGY FACILITY

(71) Applicant: Fraunhofer-Gesellschaft zur Förderung der angewandten Forschung e.V., Munich (DE)

(72) Inventors: Jan Wenske, Radbruch (DE); Hongkun Zhang, Bremerhaven (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 96 days.

(21) Appl. No.: 16/761,626

(22) PCT Filed: Oct. 23, 2018

(86) PCT No.: PCT/EP2018/079072
§ 371 (c)(1),
(2) Date: May 5, 2020

(87) PCT Pub. No.: WO2019/091777
PCT Pub. Date: May 16, 2019

(65) Prior Publication Data
US 2021/0172814 A1    Jun. 10, 2021

(30) Foreign Application Priority Data

Nov. 8, 2017   (DE) .............. 10 2017 219 886.9

(51) Int. Cl.
*G01L 3/04*     (2006.01)
*F03D 15/00*    (2016.01)
(Continued)

(52) U.S. Cl.
CPC ............... *G01L 3/04* (2013.01); *F03D 15/00* (2016.05); *F03D 17/00* (2016.05); *G01L 5/00* (2013.01);
(Continued)

(58) Field of Classification Search
CPC ..... G01L 3/04; G01L 3/10; G01L 5/00; G01L 27/002; G01L 25/003; G01L 3/12;
(Continued)

(56) References Cited

U.S. PATENT DOCUMENTS

| 8,001,848 B2 * | 8/2011 | White | G01L 3/109 |
| | | | 73/862.327 |
| 8,621,940 B2 * | 1/2014 | Klein-Hitpass | F03D 17/00 |
| | | | 73/862.326 |

(Continued)

FOREIGN PATENT DOCUMENTS

| DE | 102013227055 A1 | 6/2015 |
| EP | 2072984 A2 | 6/2009 |
| WO | WO-2017000949 A1 | 1/2017 |

OTHER PUBLICATIONS

"International Application No. PCT/EP2018/079072, International Search Report dated Feb. 13, 2019", (Feb. 13, 2019), 2 pgs.
(Continued)

*Primary Examiner* — Freddie Kirkland, III
(74) *Attorney, Agent, or Firm* — Schwegman Lundberg & Woessner, P.A.

(57) ABSTRACT

A method and a device for measuring the torque in the drivetrain (1) of a wind power plant is described, having at least two incremental encoders (7, 8) which are positioned at two different positions on at least one shaft (3) of the drivetrain (1) and which each supply periodic rotational signals, wherein the phases of the rotational signals are evaluated in order to detect a phase shift, and a torque of the
(Continued)

Figure 1A:
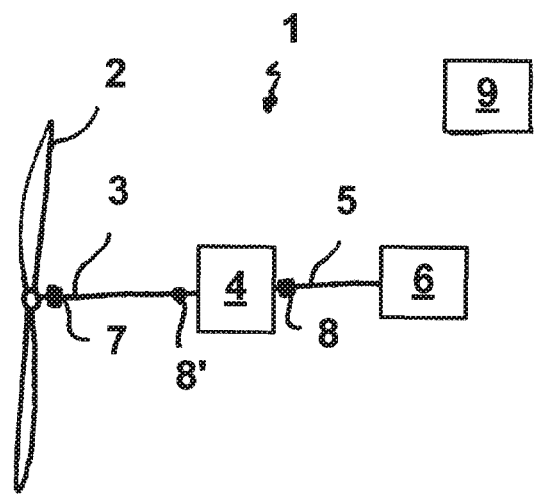

shaft (1) is determined from the phase shift. The detected phase shift is corrected as a function of a zero load phase shift ($A_{Zero}$), using a rigidity factor K, wherein, in order to determine the zero load phase shift ($A_{Zero}$) and the rigidity factor K, in-situ calibration is carried out before and/or between the torque-determining processes. The in-situ calibration is performed at zero load of the wind power plant, i.e. below a rated rotational speed and with a generator torque equal to zero, and at the rated load of the wind power plant, i.e. at the rated rotational speed and with a generator torque greater than zero.

20 Claims, 4 Drawing Sheets

(51) Int. Cl.
  *F03D 17/00* (2016.01)
  *G01L 5/00* (2006.01)
  *G01L 27/00* (2006.01)

(52) U.S. Cl.
  CPC ........ *G01L 27/002* (2013.01); *F05B 2260/40* (2013.01)

(58) Field of Classification Search
  CPC ...... F03D 15/00; F03D 17/00; F05B 2260/40; F05B 2240/40; F05B 2270/335; F05B 2270/809; Y02E 10/72; G01P 3/48; G01P 21/02

See application file for complete search history.

(56) References Cited

U.S. PATENT DOCUMENTS

| | | | |
|---|---|---|---|
| 9,353,727 B2* | 5/2016 | Slot | F03D 1/065 |
| 9,366,230 B2* | 6/2016 | Perley | F03D 7/045 |
| 10,436,673 B2* | 10/2019 | Olesen | F16H 59/141 |
| 10,669,986 B2* | 6/2020 | Kristoffersen | F03D 7/0296 |
| 2009/0151476 A1* | 6/2009 | White | G01L 3/109 |
| | | | 73/862.327 |
| 2012/0067138 A1 | 3/2012 | Klein-Hitpass et al. | |
| 2018/0164183 A1* | 6/2018 | Olesen | G01L 1/048 |
| 2020/0284242 A1* | 9/2020 | Caponetti | F03D 17/00 |

OTHER PUBLICATIONS

"International Application No. PCT/EP2018/079072, Written Opinion dated Feb. 13, 2019", (Feb. 13, 2019), 8 pgs.

Beladi, S. E., "Experiment Two (2) Torsional testing of Circular Shafts", Mechanics of Materials Lab, Retrieved from Internet: http://web.eng.fiu.edu/munroen/Classes/3.%20LAb%20Manual%20for%20Torsion%20Experiment%20Two.pdf [retrieved on Jan. 30, 2019], (Feb. 6, 2015), 5 pgs.

* cited by examiner

METHOD AND DEVICE FOR THE TORQUE MEASUREMENT IN THE DRIVE TRAIN OF A WIND ENERGY FACILITY

PRIORITY APPLICATIONS

This application is a U.S. National Stage Filing under 35 U.S.C. § 371 from International Application No. PCT/EP2018/079072, filed on Oct. 23, 2018, and published as WO2019/091777 on May 16, 2019, which claims the benefit of priority to German Application No. 10 2017 219 886.9, filed on Nov. 8, 2017; the benefit of priority of each of which is hereby claimed herein, and which applications and publication are hereby incorporated herein by reference in their entirety.

The invention relates to a method for the torque measurement in a drive train, preferably in a drive train of a wind energy facility. Furthermore, the invention relates to a device for the torque measurement in a drive train, preferably in a drive train of a wind energy facility.

Methods for torque measurement in a drive train of a wind energy facility are known in the state of the art. WO 2017/000 949 A1 for example describes a method which determines the torque acting upon the drive train on the basis of a twisting. This method is based on the consideration that a shaft twists due to the application of a torque and this twisting therefore represents a direct measure for the applied torque. In order to determine the twisting, two sensors which measure a rotation speed of the shaft are positioned at two different positions on the drive train. The sensors provide the rotation speeds in the form of frequencies as an output signal. The output signals of the two sensors are superimposed, so that a third signal is generated, said third signal being dependent on the first and the second rotation speed. The drive train is twisted due to a change of the torque which acts upon the drive train. Given a wind energy facility and a torque which is applied onto the rotor blades by the wind, the rotor mains shaft for example, on which one of the sensors is arranged, herein twists such that the output signal of the one sensor and hence the third signal changes. The deformation of the rotor main shaft is proportional to the torque which acts upon the shaft, so that one can derive the torque by way of a comparison of the third signal with a reference value. The torque which is determined in such a manner is mostly too inaccurate for a closed-loop control (regulation) of the wind energy facility, for load minimisation, for optimising the energy yield and/or for the active oscillation damping in wind energy facilities.

DE 10 2013 227 055 A1 relates to a method for determining a rotation angle position and a speed of a shaft of a drive train, wherein at least two sensors are arranged on the shaft in the circumferential direction and detect a measurement value which characterises the rotation. The rotation angle position is determined from the measurement values, wherein a distance of the two sensors is taken into account with this evaluation and the torque is determined from the rotation angle.

In view of this state of the art, it is the object of the present invention to suggest a method which is comparatively inexpensive and which improves an accuracy of torque measurements. Furthermore, the object of the invention is to suggest a device for indeed carrying out this method.

This object is achieved by a method with the features of claim 1 as well as by a device according to the further independent claim. Advantageous further embodiments result from the features of the dependent claims and of the embodiment example.

The method according to the invention is suitable for torque measurement in a drive train, in particular in a drive train in a wind energy facility. At least two incremental encoders are positioned at two different positions on at least one shaft of the drive train, for example on a rotor main shaft of a wind energy facility and each provide periodic rotation signals given a rotation movement of the shaft. The rotation signals can herein be present for example as rectangular signals or as sine signals. The phases of the rotation signals are evaluated for determining a phase shift between the rotation signals of the two incremental encoders. A torque of the shaft is determined from the phase shift.

The evaluated phase shift is corrected in dependence on a first zero-load phase shift and using a stiffness factor K, wherein an in-situ calibration for determining the zero-load phase shift and the stiffness factor is carried out before and/or between the torque measurements.

Within the framework of the in-situ calibration, a first zero-load signal of the first incremental encoder and a second zero-load signal of the second incremental encoder are measured over a first measuring time period. A temporally averaged zero-load phase shift is determined between the first zero-load signal and the second zero-load signal. The wind energy facility is operated below a nominal speed during the first measuring time period, wherein a generator torque is set to zero.

Furthermore, the in-situ calibration comprises a determining of the stiffness factor K. To this end, a first nominal load signal of the first incremental encoder and a second nominal load signal of the second incremental encoder are measured over a second measuring time period. A generator torque is kept larger than zero at nominal load. A temporally averaged nominal load phase shift is determined between the first nominal load signal and the second nominal load signal. The stiffness factor K is determined in dependence on the nominal load phase shift.

The suggested method for the torque measurement has the advantage that a comparatively simple and inexpensive torque measurement in the drive train can be carried out. Furthermore, the torque measurement is adequately accurate due to the in-situ calibration. An adequate accuracy of the torque measurement can be advantageous in particular for the regulation of wind energy facilities and improve these. A wind energy facility regulation can be used for example for the load minimisation within the mechanical drive train, for the optimisation of the energy yield by way of an improved MPP tracking (maximum power point tracking) in the part-load region, for the active oscillation damping within the drive train or for a more accurate determining of the efficiency.

The determined phase shift is preferably corrected by way of the subtraction or addition of the zero-load phase shift. The determined phase shift can further be corrected by way of multiplication by the stiffness factor K.

In order to measure the nominal load signals during the second measuring time period, the wind energy facility is preferably operated at nominal load, i.e. at a nominal speed. Herein, the rotor speed is preferably almost constant, which in particular is given at low fluctuations of the wind speed. The generator is connected to the rotor main shaft in a manner such that a rotation movement of the rotor main shaft is transmitted onto the generator input shaft. Typically, a gear is intermediately connected between the rotor main shaft and the generator input shaft, so that the speeds of the rotor main shaft and of the generator input shaft can be different. The generator torque typically corresponds to an air gap torque, i.e. to an internal generator torque between the stator and the rotor of the generator.

In one embodiment, the generator can be connectable to the gear output shaft by way of a coupling, so that the generator can be for example decoupled during the first measuring time period and the generator torque can set in from zero.

In a further embodiment, the generator torque can be kept essentially constant and recorded by way of a wind energy facility control system or regulation during the second measuring time period. To this end, the rotor speed can be regulated to a facility nominal speed via the rotor blade adjustment, also called pitch regulation. The pitch regulation can have sluggish characteristics, so that the rotor speed due to the dynamic braking and acceleration torque components fluctuates about the facility nominal speed in a range between ±10% and can cause a fluctuation in the generator torque. The generator torque can therefore be averaged over the second measuring time period. The preferably averaged generator torque can be divided by the phase shift which is averaged over the second measuring time period, for determining the stiffness factor K.

The generator torque can be determined numerically by a converter from generator parameters, i.e. air gap torque and the generator speed. To this end, for example a generator speed signal can be made available to the converter by one of the incremental encoders. A generator speed signal can also be transferred to the converter from a further incremental encoder. Herein, the further incremental encoder is preferably arranged as close as possible to the generator, preferably at the generator end of the output side.

In one embodiment, the first and/or the second measuring time period is at least 2 minutes, preferably at least 4 minutes, particularly preferably at least 5 minutes. The first and/or the second measuring time period is usually maximally 20 minutes, preferably maximally 15 minutes, particularly preferably maximally 10 minutes long. The zero-load phase shift and/or the stiffness factor K can therefore be determined in a comparatively short time. Furthermore, an adequate accuracy of the zero-load phase shift and/or of the stiffness factor can be achieved since several values for the zero-load phase shift and/or for the stiffness factor K can be determined over the respective measuring time period and be averaged.

In one embodiment, the wind energy facility can be braked for example from a wind energy normal operation, for reaching a speed below the nominal speed for determining the zero-load phase shift during the in-situ calibration. The measurement values of the two incremental encoders can herein be evaluated in a range of predefined speeds, for example between 1 and 5 rpm, even more preferred between 1 and 3 rpm, for determining the zero-load phase shift. In normal operation, the rotor is typically rotated into the wind such that the wind drives the rotor, so that a positive drive torque acts upon the rotor main shaft and preferably moves the rotor main shaft at a nominal speed. The rotor blades can be brought into the feathering position via a pitch adjustment of the rotor blades for braking the wind energy facility, so that the wind can no longer exert a positive drive torque onto the rotor main shaft via the rotor. Typically, the rotor speed further decreases by way of an aerodynamic braking moment. The generator can herein be switched off, for example by way of decoupling the gear output shaft and the generator input shaft, so that a generator moment is equal to zero. Alternatively, the converter can also be disconnected.

In a further embodiment, the wind energy facility can also be started up from a switched-off state for achieving a speed below the normal speed. Herein, the measurement values of the two incremental encoders can be evaluated in a range of predefined speeds, preferably between 1 and 5 rpm, even more preferably between 1 and 3 rpm, for determining the zero-load phase shift. On starting up the wind energy facility, the rotor blades are usually moved from a feathering position in the direction of a nominal position in a very slow manner, for example by way of twisting the rotor blades by about 1° per minute. Acceleration moments can be reduced by way of a slow adjustment of the rotor blades from the feathering position into the nominal position. The generator can preferably also be switched off on starting up the wind energy facility, so that the generator torque is preferably equal to zero.

One can envisage determining an averaged zero-phase shift on starting up and on braking the wind energy facility. To this end, the zero-load phase shift which is determined after the braking of the wind energy facility and the zero-load phase shift which is determined after starting up the facility can be averaged. This can have the advantage that the zero-load shift has a higher accuracy. This in turn can have an effect on the accuracy of the torque measurement values during the torque measurements since, as already explained above, the torque measurement values are corrected by the zero-load shift. Furthermore, it can be advantageous to start up the wind energy facility before an in-situ calibration and to operate it over a certain time period, for example at least 30 minutes, without torque measurements, so that the drive train of the wind energy facility warms up and has reached its nominal temperature.

In one embodiment, the incremental encoder can be arranged on two different shafts. The shafts can be coupled to one another by a gear. The transmission ratio of the gear is preferably constant. Typically, one of the incremental encoders, hereinafter denoted as the first incremental encoder, is arranged on the rotor main shaft of the wind energy facility. Particularly preferably, the first incremental encoder is arranged close to the rotor. Herein, the rotor main shaft can in particular be the gear input shaft. Typically, the other of the incremental encoders, hereinafter denoted as the second incremental encoder, is arranged on a gear output shaft. Alternatively, the second incremental encoder can likewise be arranged on the rotor main shaft. The second incremental encoder is preferably arranged at a distance to the first incremental encoder, wherein the distance is also dependent on the dimensions of the shaft. It can be for example between 50 cm and 300 cm. This has the advantage that the accuracy for detecting the torque is improved. On determining the stiffness factor K, preferably the transmission ratio of the gear is to be taken into account. In particular, given an arrangement of the first and the second incremental encoder on the rotor main shaft, the determined torque can be multiplied by the transmission ratio of the gear.

In an exemplary embodiment, the incremental encoders can be based on known optical, inductive or magnetic measuring principles. Such incremental encoders typically comprise an encoder and an encoder disc which are very robust with regard to static and dynamic displacements between the encoder and the encoder disc. Measuring errors or sensor failures can thus be reduced or avoided. The encoder disc can also be designed as an encoder tape (sensor tape) or an encoder ring, in particular given the application on a shaft.

In a further embodiment, the incremental encoder can have a resolution of at least four impulses, preferably at least 16 impulses and/or maximal 16384 impulses, particularly preferably maximally 4096 impulses per shaft revolution. This has the advantage that standard incremental encoders can be used, said standard incremental encoders being comparatively inexpensive compared to high-resolution incremental encoders with resolutions of more than 16384 impulses per shaft revolution. Furthermore, standard incremental encoders have the advantage that they are comparatively robust with regard to impacts and load changes. Preferably, the selection of the impulses upon the encoder discs or encoder rings is such that a uniform, i.e. gapless distribution of the impulses results over the respective shaft periphery. In particular, this is advantageous if the incremental encoders are arranged at positions at which the shaft diameters differ. The phases of the incremental encoders can be compared in a simpler manner byway of a uniform impulse distribution and a change of the phase shift is comparatively simple to determine.

The impulse number per shaft revolution of the two incremental encoders can be designed identically in one embodiment. The impulse number can also be dependent on the installation location. The impulse numbers of the incremental encoders can also differ from one another by way of an integer multiple. Herein, the impulse number per shaft revolution of the incremental encoder on a generator input shaft can in particular be smaller than the impulse number per shaft revolution of the incremental encoder on the rotor main shaft, since the rotor main shaft is typically designed to be significantly thicker. An incremental encoder on the rotor main shaft accordingly preferably offers at least 1000 impulses per revolution, whereas an incremental encoder on the generator shaft which mostly has a smaller circumference has lower impulse numbers. Preferably, the signals of the two incremental encoders are matched to one another in a manner such that the impulses are produced synchronously and a synchronous pulse pattern arises. The gear transmission can herein be included in the calculation.

In a further embodiment, the first and/or the second incremental encoder, preferably before a torque measurement, can be adjusted in a manner such that the measurement signals of the incremental encoders have a phase shift with a predefined value, preferably of 90°, if the wind energy facility is operated below a nominal speed and a generator torque is equal to zero, wherein the first and/or the second incremental encoders are adjusted after their arrangement if the desired value has not been reached. To this end, the first and/or the second incremental encoders can be adjusted for example by way of an electromechanical adjustment device. A phase shift of 90° is typically advantageous since in such a manner an available measuring region can be divided in equal parts onto positive and negative shaft moments.

Furthermore, the present invention relates to a device for the torque measurement in the drive train of a wind energy facility, comprising at least two incremental encoders which are positioned at different positions on at least one shaft of the drive train, and an evaluation device which is connected to the incremental encoders. The evaluation device is configured to determine a phase shift from the measurement signals of the incremental encoders and to determine a torque of the shaft from the phase shift. Furthermore, the evaluation device is configured to correct the phase shift in dependence on, preferably by way of addition or subtraction of, a zero-load phase shift and using a stiffness factor K, preferably by multiplication by the stiffness factor K, and to carry out an in-situ calibration for determining the zero-load phase shift and stiffness factor K before and/or between the torque evaluations.

The evaluation device for carrying out the in-situ calibration is configured to measure a first zero-load signal of the first incremental encoder and a second zero-load signal of the second incremental encoder over a first measuring time period and to determine a temporally averaged zero-load phase shift between the first zero-load signal and the second zero-load signal, wherein the wind energy facility is operated below the nominal speed and a generator torque is equal to zero during the first measuring time period. The evaluation device is further configured to measure a first nominal load signal of the first incremental encoder and a second nominal load signal of the second incremental encoder over a second measuring time period and to determine a temporally averaged nominal load phase shift between the first nominal load signal and the second nominal load signal and to determine the stiffness factor K in dependence on the nominal load phase shift, wherein the wind energy facility during the second measuring time period is operated at nominal speed and the generator torque is kept larger than zero.

The device according to the invention can be integrated into existing drive trains in a comparatively inexpensive and simple manner. Furthermore, the advantageous methods for torque measurement which have been described above can advantageously be carried by way of the device.

In one embodiment, the evaluation device can comprise a logic circuit for determining the phase shift between the first and the second incremental encoder, for example an AND logic unit or an OR logic unit, a correlator or a phase locked loop (PLL).

In one embodiment, the evaluation device can comprise an analysing unit, for example a cross-correlator or a phase measuring element, for determining the mechanical angle twist between the two incremental encoders and therefore the torque.

In one embodiment, the evaluation device can comprise a flank-controlled timer. Output signals can be digitally measured in a relative impulse time integral, i.e. in a pulse-pause ratio, by way of the flank-controlled timer. Herein, the timer typically starts with a rising flank, stops with a dropping flank and is subsequently set back. The impulse period can therefore be measured on a time basis of an integrated oscillator (internal clock generator). The period duration of the impulse sequences can serve as a reference value and can likewise be determined via a timer or impulse counter.

In a further embodiment, the evaluation device can be connected to the incremental encoders via an electric lead connection.

In one possible embodiment, the device for the torque measurement can comprise the aforementioned electromechanical adjusting device for setting/adjusting a phase shift between the first and the second incremental encoder. The electromechanical adjusting device can preferably be formed on at least one of the incremental encoders. The electromechanical adjusting device can comprise for example a play-free, electromotoric linear drive, for example a spindle or a cam drive along the shaft contour. The at least one incremental encoder can be moved in its position relative to the shaft, preferably in the tangential direction to the shaft and/or along the periphery of the shaft, by way of the adjusting device. The incremental encoders can be adjusted automatically or manually by touch. Preferably, the incremental encoders are adjusted whilst the wind energy facility is not subjected to any external torques and the rotor blades are in the feathering position. The at least one incremental encoder can be adjusted in a mechanical manner radially or along an outer contour of the shaft, on which the respective incremental encoder is arranged, in a manner such the complete theoretic measuring range is run through for the pulse-pause ratio. Subsequently, the incremental encoder or encoders can be displaced in such manner until the current measuring signal for the pulse-pause ratio corresponds to the average with regard to the minimal and the maximal pulse-pause ratio. The adjusting of pulse-pause ratio can be repeated arbitrarily often on operation. The pulse-pause ratios of the incremental encoders are preferably matched to one another before the in-situ calibration and before the torque measurement.

The further features which have been explained in the present application with reference to the method can also be features of the device. Vice-versa, features which have been explained in the present application with reference to the device can also relate to the method.

Embodiment examples of the invention are hereinafter described by way of figures.

Figure 1B:
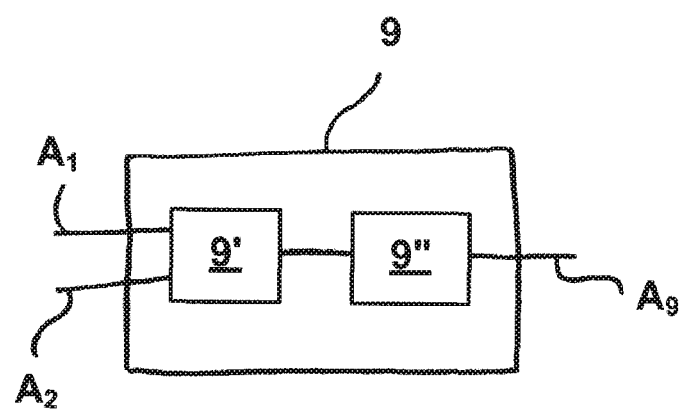
Figure 2:
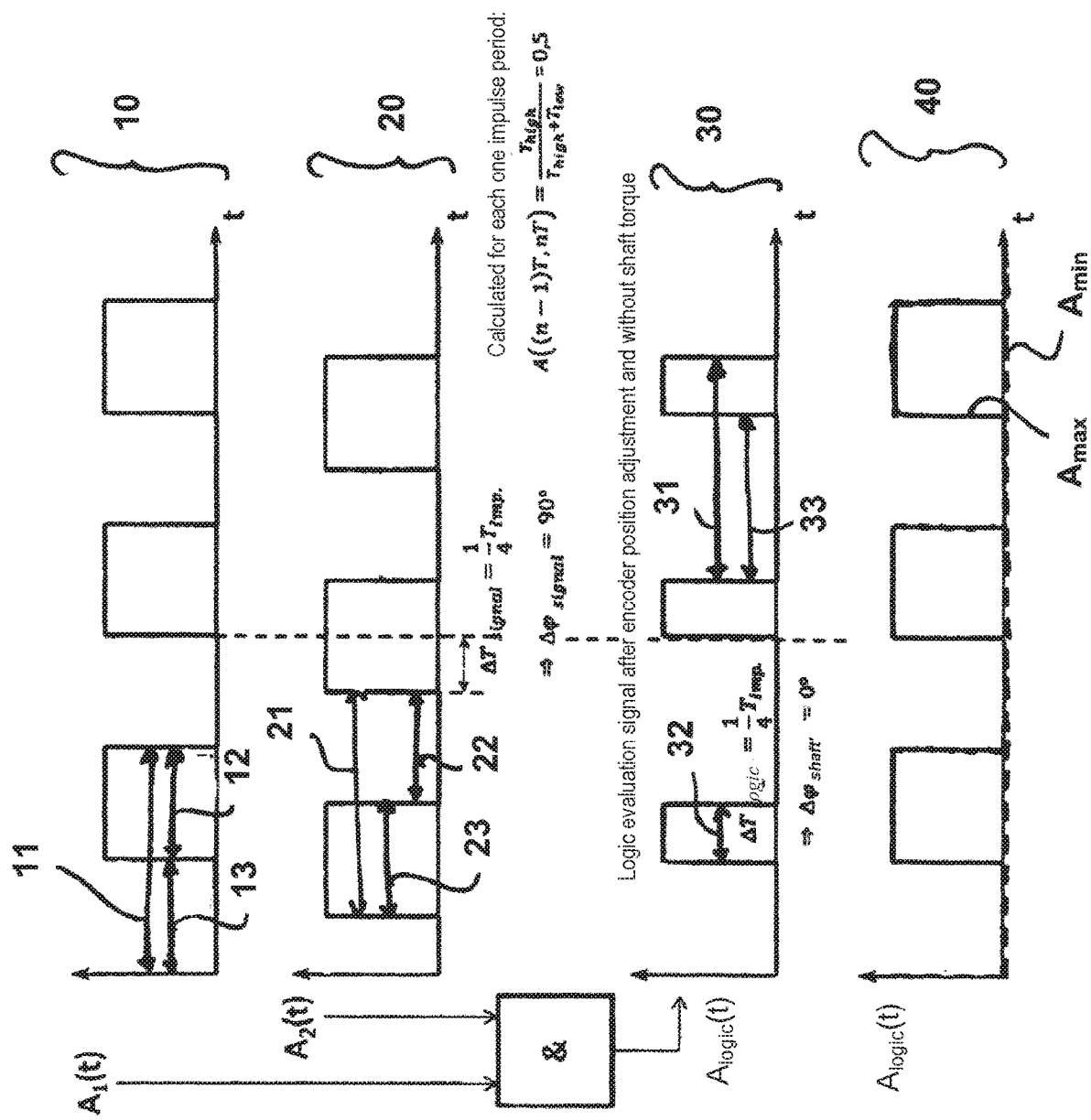
Figure 3:
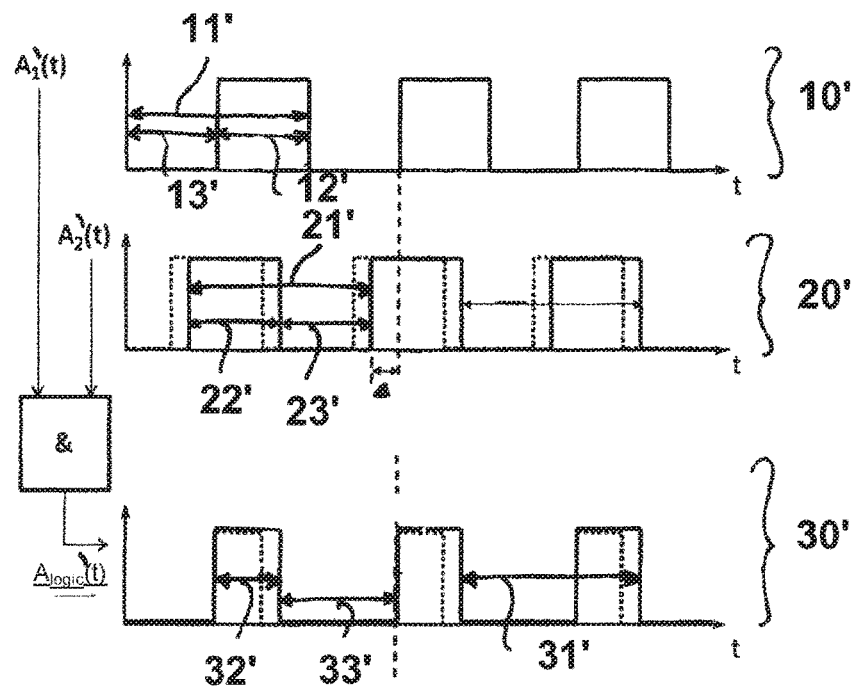
Figure 4:
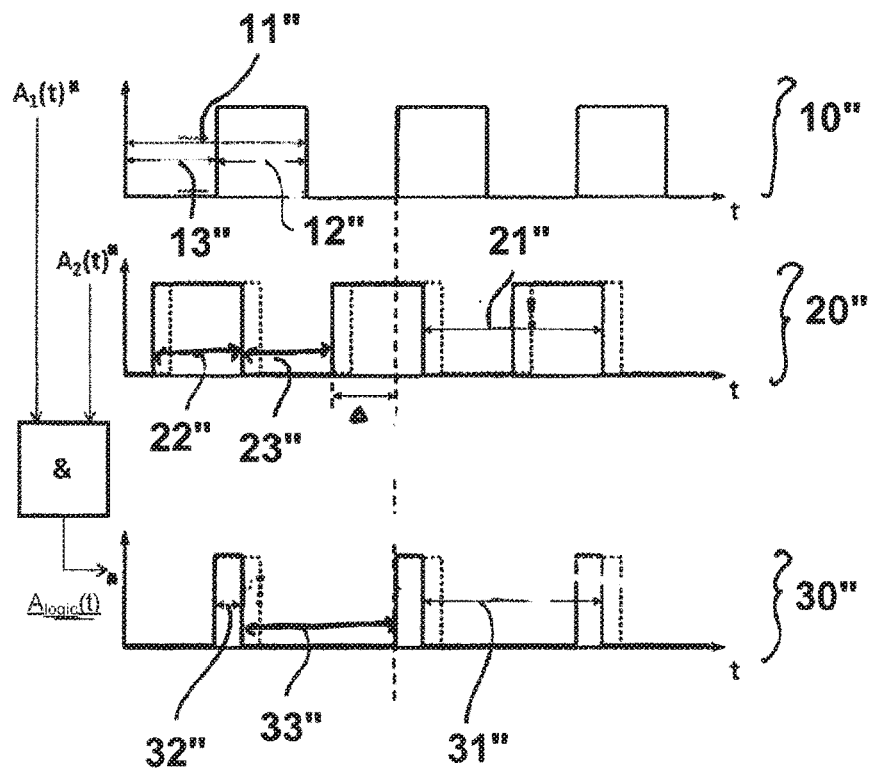
Figure 5:
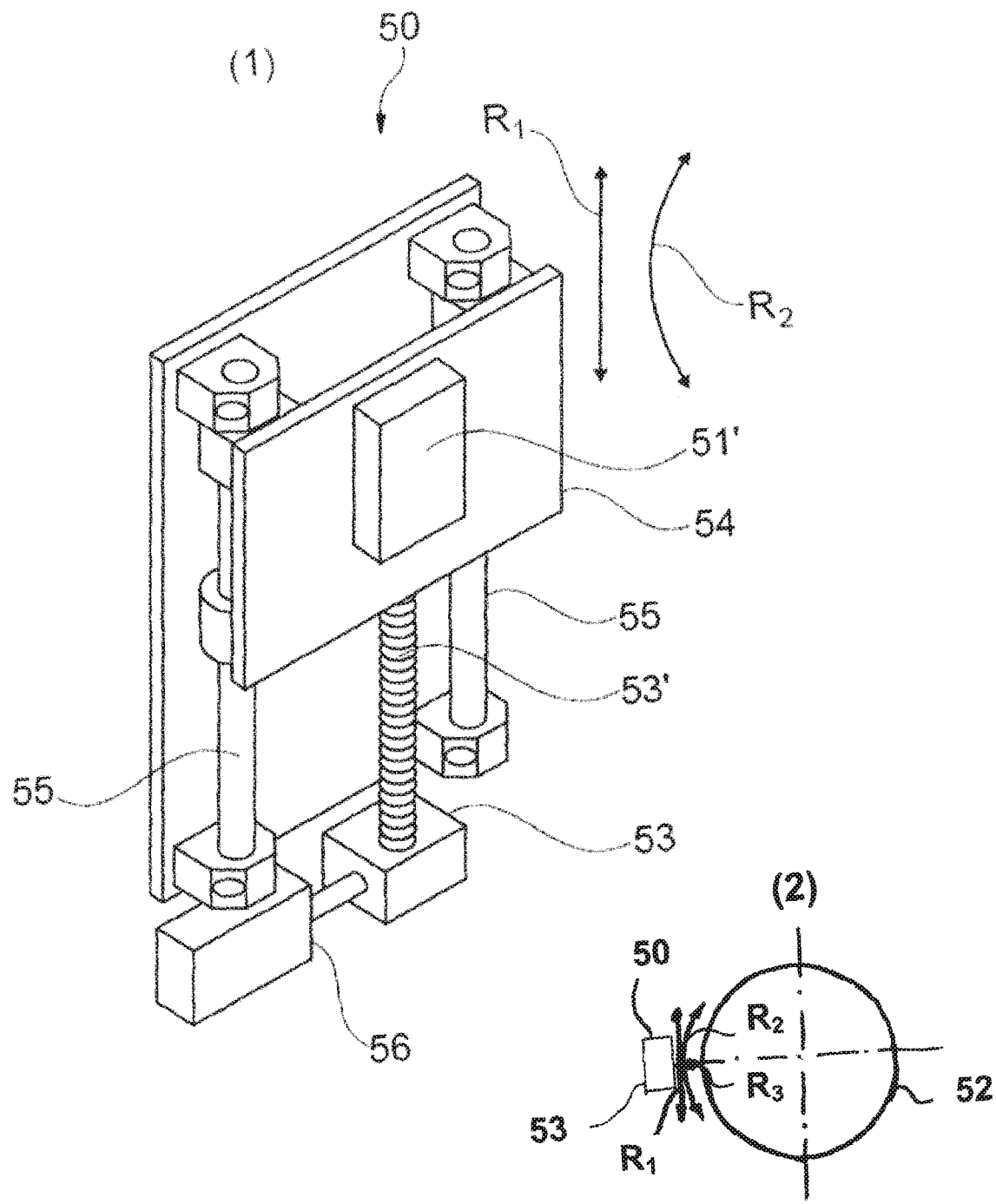

There are shown in:

FIG. 1a a drive train of a wind energy facility in a schematic representation,

FIG. 1b an evaluation device of the wind energy facility of FIG. 1a,

FIG. 2 rotation signals of a first incremental encoder and of a second incremental encoder and a signal of a logic evaluation given rotation without load, FIG. 3 rotation signals of the first incremental encoder and of the second incremental encoder and the signal of a logic evaluation given a rotation under load of a positively defined torque, FIG. 4 rotation signals of the first incremental encoder and of the second incremental encoder and the signal of a logic evaluation given a rotation under load of a negatively defined torque, FIG. 5 an adjusting device for adjusting at least one of the two incremental encoders.

A drive train 1 of a wind energy facility is schematically represented in FIG. 1a. A rotor 2 is arranged on a rotor main shaft 3. The rotor main shaft 3 is an input shaft of a gear 4. The gear 4 comprises a gear output shaft 5 which as a generator input shaft is simultaneously connected to a generator 6. A wind force which acts upon the rotor 2 rotates the rotor and thus drives the rotor main shaft 3. The gear 4 steps up a slow rotation movement of the rotor main shaft 3 into a quicker rotating movement of the gear output shaft 5 for the generation of electricity in the generator 6. A first incremental encoder 7 is arranged on the rotor main shaft 3. A distance between the rotor 2 and the first incremental encoder 7 is smaller than a distance between the first incremental encoder and the gear 4. A second incremental encoder 8 is arranged on the gear output shaft 5. The second incremental encoder 8 can also be arranged on the rotor main shaft 3, for example at a position 8'. The position 8' has a smaller distance to the gear 4 than to the rotor 2 and both incremental encoders in this case should be arranged at the greatest possible distance. The incremental encoders 7 and 8 are connected to an evaluation device 9 (the connection is not represented in FIG. 1 for a better overview). The incremental encoders 7 and 8 provide output signals in the form of periodic rotation signals. These rotation signals are transferred to the evaluation device 9 via an electric lead connection.

Given normal operation of the wind energy facility, the rotor 2 is driven in accordance with the wind strength and wind direction, so that different torques which change with time act upon the rotor main shaft 3. In order to be able to regulate the wind energy facility in a manner adapted to this, the respective torque M (t) is required. The necessary torque measurement is based on a direct evaluation of the relative twist angle between the two incremental encoders 7, 8. The mechanical angle twist between both encoders leads to a phase shift of the encoder output signals and on superimposing the output signals leads to a measurement signal $A(t)_{meas}$, with a changing pulse-pause ratio (in the case of rectangular signals of the incremental encoder) as a direct measure for this twisting and therefore for the effective torque (is explained further below in more detail).

FIG. 1b shows the evaluation device 9 of FIG. 1a. The evaluation device comprises a superposition or logic circuit 9' which links the output signals of the incremental encoders 7, 8 to one another as measurement signals $A_1$ and $A_2$. This logic circuit is designed for example as an AND logic unit. An output signal of the logic circuit 9' is led further to an analysing unit 9'' which determines a mechanical angle twist between the two incremental encoders and determines the torque therefrom. An output signal $A_9$ of the evaluation device 9 is forwarded to the wind energy facility regulation.

FIG. 2 shows measurement signals or rotation signals $A_1$ and $A_2$ of the two incremental encoders 7, 8 on rotating without a load. The rotation signal $A_1$ of the first incremental encoder 7 is represented in a diagram 10 and the rotation signal $A_2$ of the second incremental encoder 8 is represented in a diagram 20. The rotation signal $A_1$ has an impulse amplitude 11 or $T_{imp}$ with a pulse-pause ratio or duty cycle of 50/50. Herein, the impulse duration $T_{high}$ 12 is just as long as the pause time $T_{low}$ 13.

The impulse period is $T_{imp}=60/nx$ (s), wherein x is the number of the impulses per revolution and n the shaft speed in r.p.m. The duty cycle is $TV((n-1)T, nT)=T_{high}/(T_{high}+T_{low})=0.5$.

The rotation signal $A_2$ has an impulse period 21 which corresponds to the impulse period 11 and likewise has a pulse-pause ratio of 50%. Herein, the pulse duration 22 is just as long as the pause time 23. Furthermore, the pulse duration 22 corresponds to the pulse duration 12 and therefore also the pause time 23 to the pause time 13. The rotation signal $A_2$ is shifted with respect to the rotation signal $A_1$ by a quarter of the period 21 or 11. This corresponds to a rotation angle of $\Delta\varphi_{signal}=90°$.

The measurement signals $A_1$ and $A_2$ are transferred to the evaluation device 9. The measurement signals $A_1$ and $A_2$ are superimposed in the evaluation device 9, here comprising an AND logic unit 9'. The AND logic unit 9' thereupon provides an output signal $A_{logic}$ which is represented in a diagram 30 and which has an impulse period 31 which corresponds to the impulse period 11 and 21. A pulse duration 32 herein corresponds to a quarter of the impulse period 31, whereas a pause time 33 consequently corresponds to three-quarters of the impulse period 31 (pulse-pause ratio 25%).

In order to achieve the aforementioned phase difference or phase shift of preferably half an impulse period (with the pulse-pause ratio of 50% this corresponds to a phase shift of 90%) for the impulse signals of the two incremental encoders 7, 8 in the non-loaded state, a position adjustment between the encoders is carried out since such a relative adjustment of the two incremental encoders 7, 8 cannot be reliably ensured during the assembly.

In order to adjust the position, the incremental encoders 7, 8 are adjusted by way of an adjusting device in a manner such that the desired pulse-pause ratio is achieved. To this end, one of the two encoders, i.e. the incremental encoder 7 is automatically or manually adjusted along a tangential path or one which is adapted to the shaft contour, for example along a threaded rod or spindle. Herein, it can move over the complete theoretical measuring region during the adjusting. The pulse-pause ratio of 50% is specified by way of example in the description, and any arbitrary pulse-pause ratio can be set, as long as a conclusive evaluation of the signals is achieved.

In a further diagram 40, the output signal $A_{logic}$ is represented in the extreme positions $A_{min}$ and $A_{max}$ during the adjustment of the incremental encoders 7, 8 on moving over the complete theoretical measuring region. The dashed line represents the output signal $A_{min}$ and the unbroken line represents the output signal $A_{max}$ and herewith the limit of the adjustment.

After the previously described position adjustment, an in-situ calibration method is carried out, in order to determine a zero-load phase shift or a zero-point adjustment of the torque measuring device and a stiffness factor K which takes into account an amplification factor or a gradient of the torque measurement characteristic line of the drive train or a stiffness of the drive train.

Before a calibration of the torque measuring device, the drive train of the wind energy facility should have reached its nominal operating temperature. This can be achieved e.g. by an adequately long operation of the wind energy facility without the use of the torque measuring device. This can be carried out without any restrictions since the additional torque sensorics, although improving the facility behaviour, however are not absolutely necessary for the operation.

In order to determine the zero-load phase shift, the wind energy facility is brought into the idling region, i.e. into non-productive operation, via the facility's control system, given operating conditions below the nominal speed, preferably with weak wind condition. The braking of the facility into the idling speed region can be carried out actively via the pitch adjustment of the rotor blades. In this operational region, the facility is taken off the mains, i.e. the generator is not "subjected to current" and does not therefore develop a torque $M_{gen}(t)=0$, wherein this state is a necessary constraint. The blades of the facility are then situated completely in the feathering position, at which the pitch angle is roughly 90°. The rotor therefore no longer develops a positive drive torque, in contrast an aerodynamic braking moment $M_{rot}(t)\tilde{~}0$ is active, but this becomes exponentially smaller with a reducing speed.

After switching off the generator, the measurement values which are continuously provided by the torque measuring device are recorded over the speed in the range of very small speeds (between 3 and 1 rpm). In the evaluation device 9, the recorded measurement values are superimposed and a temporally averaged zero-load phase shift $A(t)brake$ between the output signal of the first incremental encoder 7 and of the second incremental encoder 8 is determined for determining the zero point of the torque measuring device. The determined zero-load phase shift is stored in the evaluation unit as a zero-point of the torque measuring device.

This measurement can also be repeated on starting up the facility given weak wind and in idling operation for determining a zero-load phase shift $A(t)_{high}$, likewise given a switched-off generator, wherein it is preferably carried out in the same rotor speed range (1-3 rpm). The blades are moved very slowly 1°/min out of the feathering position in the direction of the nominal position by way of the control system, in order to minimise the influence of acceleration moments $M_{rot}(t)\tilde{~}0$. The average of the averaged measurement values of the two trials (course of braking, starting up) is then formed $$A_{zero}=(\overline{A(t)_{brake}}+\overline{A(t)_{high}})/2$$

and the zero-load phase shift or the zero point of the torque measurement characteristic line which is represented by this is accordingly adapted and is stored in the evaluation device.

For an exact measurement of the zero-load phase shift, it is advantageous for both trials to be carried out in a directly subsequent manner. These trials may be repeated several times, as appropriate.

The determining of the stiffness factor K or of the reinforcement factor or the gradient of the torque measurement characteristic line of the torque measuring device is described hereinafter. This determining is preferably carried out in full-load operation, i.e. in the nominal operation of the facility, in order to obtain an accurate a measurement as possible over the complete torque measuring range. In this operating region, the generator torque is kept constant by the facility control system/facility regulation. The rotor speed is actively regulated to the facility nominal speed via the rotor blade adjustment (pitch). However, due to the relatively sluggish characteristics of the pitch regulation, the rotor speed fluctuates in a range of as a rule ±10% about the nominal speed, so that dynamic braking and acceleration torque components could upset the calibration of the torque measuring device. For this reason, a longer measuring time period of several minutes, preferably up to maximally 10 minutes, is selected. During this measuring time period, the generator torque should not change, i.e. the facility must operate in its nominal power region during the complete measuring time period.

The generator torque corresponds to the air gap moment and this cannot be detected by measuring technology in a direct manner, but is determined numerically from the measured electrical characteristic variables and the generator parameters by the converter which is contained in the wind energy facilities, and is "communicated" to the facility control as signal/information. As is standard, for this the converter requires a generator rotor position signal or at least a generator rotor speed signal. This signal can be provided by one of the incremental encoders 7, 8 or be provided by a standard encoder on the generator.

The torque measuring device with the evaluation device 9 according to FIG. 1b and with an evaluation according to FIG. 2 provides measurement signals with respect to a phase shift $\Delta\varphi$ between the two encoder signals given nominal operation. The temporal average of the measurement signals of the torque measuring device which specify the phase shifts, and the values of the certain generator torque result in the stiffness factor $$K=M_{Gen}/\Delta\varphi$$

by way of which hence the second necessary characteristic line point is given for determining the torque measurement characteristic line, this point corresponding to the wind energy facility nominal moment. This measurement may, where necessary, be repeated arbitrarily often. In this case too, the facility should have reached its nominal operating temperature. Optionally, the determining of this value of the characteristic line can also be carried out before determining the zero point.

The output signals or rotation signals $A_1'$ and $A_2'$ of the two incremental encoders 7, 8 in normal measuring operation under the load of the wind energy facility given a positive torque direction are represented in FIG. 3. The rotation signals $A_1'$ of the first incremental encoder 7 are specified in the upper diagram 10'. The rotation signals $A_2'$ of the second incremental encoder 8 are represented in the middle diagram 20'. In the second measuring time period, the first incremental encoder 7 provides a rotation signal $A_1'$ with an impulse period 11' and with a pulse pause ratio of 50/50. Herein, the pulse duration 12' is just as long as the pause time 13'. The rotation signal $A_2'$ has an impulse period 21' which corresponds to the impulse period 11' and likewise has a pulse-pause ratio of 50%. Furthermore, the pulse duration 22' corresponds to the pulse duration 12' and therefore the pause time 23' to the pause time 13'. The signal $A_2$ according to FIG. 2 is represented in a dotted manner. The rotation signal $A_2'$ leads the rotation signal $A_1'$ by 15% of the impulse period 21 or 11. This corresponds to a rotation angle $\Delta\varphi_{signal}$ of 54°.

The output signals $A_1'$ and $A_2'$ are superimposed in the AND logic which provides an output signal $A_{logic}'$ with an impulse period 31', wherein here too the signal $A_{logic}$ according to FIG. 2 is represented in a dotted manner. The pulse duration 32' results with $$A((n-1)T,nT)=T_{high}/(T_{high}+T_{low})=0.35$$

i.e. 35% of the impulse period 31'. The output signal $A_{logic}'$ thus contains a phase shift which results under load from the torque which is exerted upon the rotor, as well as a phase shift which already prevails during a zero-load operation of the wind energy facility. The twist angle of the shaft $\Delta\varphi_{shaft}$ which is caused by the load torque can be determined from the output signal $A_{logic}'$ with the variables according to FIG. 2 by $$\Delta\varphi_{shaft}=(A((n-1)T,nT)-0.25)/0.25 \cdot 90°/x=36°/x$$

wherein x is the number of impulses per revolution. The torque can be determined from the torque characteristic line in dependence on the phase shift. Rotation signals $A_1''$ and $A_2''$ of the two incremental encoders 7, 8 in measuring operation under load with a negative torque direction are represented in FIG. 4. The torque which acts upon the rotor main shaft corresponds to the torque of FIG. 3, but in FIG. 4, as mentioned, is defined as negatively rotating. The rotation signal $A_1''$ of the first incremental encoder 7 which corresponds to the output signal or rotation signal $A_1'$ is represented in the diagram 10'' and the rotation signal $A_2''$ of the second incremental encoder 8 is specified in diagram 20''. The rotation signal $A_2''$ corresponds to the rotation signal $A_2'$ but is displaced oppositely to $A_2'$. The time difference between the signals $A_1''$ and $A_2''$ is $\Delta T=0.35\ T_{imp}$ which corresponds to an angle $\Delta\varphi_{logic}$ of 126°. The output signals $A_1''$ and $A_2''$ are superimposed in the AND logic which provides an output signal $A_{logic}'$ with an impulse period 31'', wherein here too the signal $A_{logic}$ according to FIG. 2 is represented in a dotted manner. The pulse duration 32'' results by $$A((n-1)T,nT)=T_{high}/(T_{high}+T_{low})=0.15$$

i.e. 15% of the impulse period 31''. The pulse duration 32'' is herein 15% of the impulse period 31''. The output signal $A_{logic}''$ represents a phase shift which results from the torque under load said torque being applied onto the rotor, as well as a phase shift which also prevails during a zero-load operation of the wind energy facility. The twist angle of the shaft $\Delta\varphi_{shaft}$ which is caused by the load torque can be determined from the output signal $A_{logic}'$ with the variables according to FIG. 2 by $$\Delta\varphi_{shaft}=(A((n-1)T,nT)-0.25)/0.25 \cdot 90°/x=-36°/x$$

wherein x is the number of impulses per revolution.

In order to measure the torque of the rotor main shaft of the wind energy facility 1, arbitrary output signals $A_{meas1}$ and $A_{meas2}$ of the two incremental encoders are evaluated as is explained with FIG. 3 and FIG. 4. Herein, the rotation signals of the incremental encoders 7, 8 are superimposed by the AND logic circuit which provides a signal $A_{measlog}$ which represents the phase shift between the two rotation signals. In order to determine a momentary torque, the signal of the zero-point evaluation $A_{zero}$ is added to this current measurement signal $A_{measlog}$ and the result is multiplied by the stiffness factor K: $M(t)=A_{measlog}(t)*K+A_{zero}*K$.

The torque signal is used for example for the regulation of the wind energy facility.

FIG. 5 shows an adjusting device 50 for adjusting an incremental encoder 51 relative to a shaft 52. An encoder disc or an encoder tape is fixedly connected to the shaft 52. The incremental encoder 51 comprises a sensor 51' for scanning the encoder disc or the encoder tape. The incremental encoder 51 can scan the encoder disc for example in a photoelectrical or magnetic manner. Toothed wheels can also be used as encoder discs.

The adjusting device 50 is represented in FIG. 5(1), whereas a cross section through the shaft 52 and the arrangement of the adjusting device 50 relative to the shaft 52 is shown in FIG. 5(1). The adjusting device 50 comprises a linear drive 53 with a spindle 53', on which a slide 54 is arranged. The incremental encoder sensor 51' is fastened to the slide. Furthermore, the adjusting device comprises two guide rails 55, along which the slide is movable. The spindle 53' of the linear drive 53 can be driven by an electric drive 56 in a manner such that the slide is displaceable along the spindle in a direction $R_1$. In FIG. 5(2) it is represented that the adjusting device 50 is preferably arranged in a manner such that the direction $R_1$ runs tangentially to the shaft 52, so that the incremental encoder sensor 51 is adjustable tangentially to the shaft 52. Furthermore, the slide 54 can be rotated about the spindle 53' so that an adjustment of the sensor 51' along the direction $R_2$, adapted to the shaft contour, is possible. The arrow $R_3$ describes the detection direction of the incremental encoder sensor 51'.

Optionally, an observer supported by a torque measurement value can be used for the facility regulation, i.e. the measured torque measurement value can use a mathematical model of the wind energy facility drive train in the form of a so-called observer for an improved facility model. The observer can mathematically estimate model-based states in the drive train and feed them back to the regulation. The speed signal from the generator speed encoder can be used for "supporting" the observer model, so that the observer does not drift away due to inaccuracies in the modelling and an estimation result which is true to expectation is achieved. The measuring device described above can improve the estimation accuracy of the observer with regard to the accuracy, i.e. with regard to the stationary deviation and dynamics (speed estimation value convergence) by way of the signals of the two incremental encoders and in particular by way of the torque signal. This observer application is optional and not absolutely necessary since the aforementioned control-technological advantages are already achieved solely by the measuring device. The regulation accuracy can be improved once again by the introduction of observer models.

The invention claimed is:

1. A method for measuring torque in a drive train of a wind energy facility, the method comprising:
    determining a phase shift and a torque of a first shaft of the drive train, the first shaft including a first incremental encoder and a second incremental encoder positioned at different locations on the first shaft, the first incremental encoder and the second incremental encoder configured to provide a first periodic rotation signal and a second periodic rotation signal, wherein a phase of the first periodic rotation signal and the second periodic rotation signal is evaluated for determining the phase shift, and the torque of the shaft is determined from the phase shift, and wherein the determined phase shift is corrected based on a zero-load phase shift and using a stiffness factor K, wherein an in-situ calibration is carried out before or between the torque determination, for determining the zero-load phase shift and the stiffness factor K, and wherein the in-situ calibration comprises the following steps:

measuring a first zero-load signal of the first incremental encoder and a second zero-load signal of the second incremental encoder over a first measuring time period and determining a temporally averaged zero-load phase shift between the first zero-load signal and the second zero-load signal, wherein the wind energy facility during the first measuring time period is operated below a specified speed and a generator torque is equal to zero; and measuring a first nominal load signal of the first incremental encoder and a second nominal load signal of the second incremental encoder over a second measuring time period, determining a temporally averaged nominal load phase shift between the first nominal load signal and the second nominal load signal, and determining the stiffness factor K based on the nominal load phase shift, wherein the wind energy facility is operated at the specified speed during the second measuring time period and the generator torque of the wind energy facility is kept larger than zero.

2. The method according to claim 1, wherein the phase shift is corrected adding or subtracting the zero-load phase shift, or multiplying by the stiffness factor K.

3. The method according to claim 1, wherein the generator torque is kept constant during the second measuring time period.

4. The method according to claim 1, wherein the first measuring time period or the second measuring time period is between 2 minutes and 20 minutes.

5. The method according to claim 1, wherein the first incremental encoder is located on one or another of the first shaft or a second shaft, wherein the second incremental encoder is located on the other of the first shaft or the second shaft, and wherein the first shaft and the second shaft are coupled to one another using a gear.

6. The method according to claim 1, wherein, the wind energy facility is braked so as to reach a speed below the specified speed, and wherein a measurement value of the first incremental encoder and the second incremental encoder is evaluated in a region of a predefined speed, wherein the predefined speed is between 5 and 1 rpm for determining the zero-load phase shift.

7. The method according to claim 6, wherein the averaged zero-load phase shift is determined, by averaging a first zero-load phase shift that is determined after the braking of the wind energy facility and a second zero-load phase shift that is determined after starting up the wind energy facility.

8. The method according to claim 6, wherein the pre-defined speed is between 1 rpm and 3 rpm.

9. The method according to claim 1, wherein the wind energy facility is started up from a shut-down state for reaching a speed below the specified speed, wherein the measured values of the first incremental encoder and the second incremental encoder evaluated in a range of a pre-defined speed between 1 and 5 rpm for determining the zero-load phase shift.

10. The method according to claim 1, wherein the first incremental encoder and the second incremental encoder are arranged in a manner such that the measured values of the first incremental encoder and the second incremental encoder given a rotation of the wind energy facility without load have a phase shift with a predefined value, and wherein the first incremental encoder or the second incremental encoder are adjusted to the pre-defined value after their arrangement.

11. The method according to claim 1, wherein the generator torque is averaged over the second measuring time period.

12. The method according to claim 1, wherein the stiffness factor K is determined by dividing by the nominal load phase shift.

13. The method according to claim 1, wherein the first measuring time period or the second measuring time period is between 4 minutes and 15 minutes.

14. The method according to claim 1, wherein the first measuring time period or the second measuring time period is between 5 minutes and 10 minutes.

15. A device for measuring torque in a drive train of a wind energy facility, comprising:

a first incremental encoder and a second incremental encoder located at different positions on at least one shaft of the drive train; and an evaluation device connected to the first incremental encoder and the second incremental encoder configured to:

determine a phase shift from a measurement signal of the first incremental encoder and the second incremental encoder;

determine a torque of the shaft to correct the phase shift based on a zero-load phase shift and using a stiffness factor K; and carry out an in-situ calibration before or between the torque measurement, for determining the zero load phase shift and the stiffness factor K, wherein the evaluation device for carrying out the in-situ calibration is configured to:

measure a first zero-load signal of the first incremental encoder and a second zero-load signal of the second incremental encoder over a first measuring time period and to determine a temporally averaged zero-load phase shift between the first zero load signal and the second zero-load signal, wherein the wind energy facility during the first measuring time period is operated below a specified speed and a generator torque is equal to zero measure a first nominal load signal of the first incremental encoder and a second nominal load signal of the second incremental encoder over a second measuring time period; and determine a temporally averaged nominal load phase shift between the first nominal load signal and the second nominal load signal and to determine the stiffness factor K based on the nominal load phase shift, wherein the wind energy facility during the second measuring time period is operated at the specified speed and the generator torque at nominal load is kept greater than zero.

16. The device according to claim 15, wherein the evaluation device comprises:

a logic circuit, wherein the logic circuit includes an AND logic unit or an OR logic unit, for determining the phase shift between the measured signals of the first incremental encoder and the second incremental encoder; and an analysing unit configured to determine a mechanical angle twist between the first incremental encoder and the second incremental encoder.

17. The device according to claim 15 further comprising:
an electromechanical adjusting device configure to a position of the first incremental encoder or the second incremental encoder in a direction tangential to the shaft or along a circumference of the shaft.

18. The device according to claim 15, wherein the first incremental encoder or the second incremental encoder is based on at least one of a magnetic measuring principle, an optical measuring principle, or an inductive measuring principle.

19. The device according to claim 15, wherein the first incremental encoder or the second incremental encoder have a resolution of at least four impulses per shaft revolution.

20. The device according to claim 15, wherein, a resolution of the first incremental encoder and a resolution of the second incremental encoder are the same or differ by an integer multiple.

* * * * *